Dec. 6, 1955  J. L. CLINE  2,725,635
MOUNTING FOR TELESCOPIC GUNSIGHTS
Filed Sept. 29, 1952  2 Sheets-Sheet 1
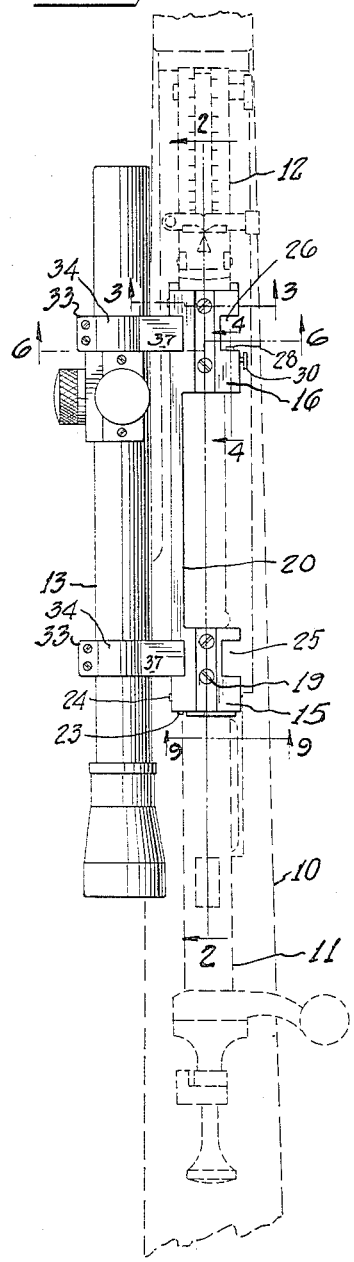
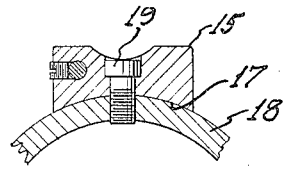
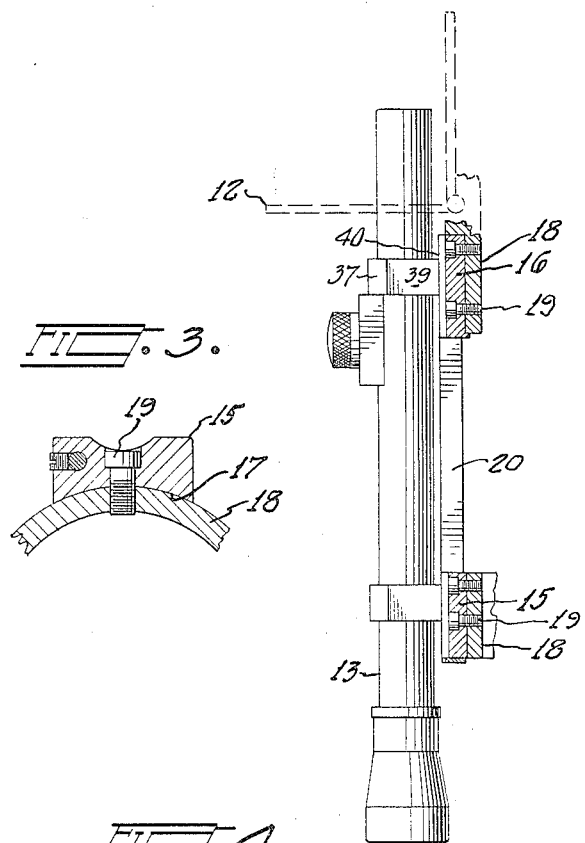
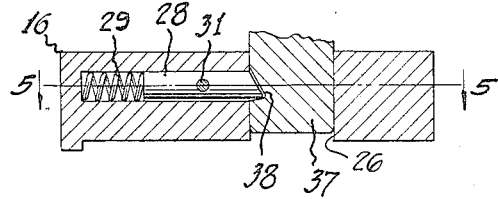
INVENTOR
JOHN L. CLINE
BY
ATTORNEY

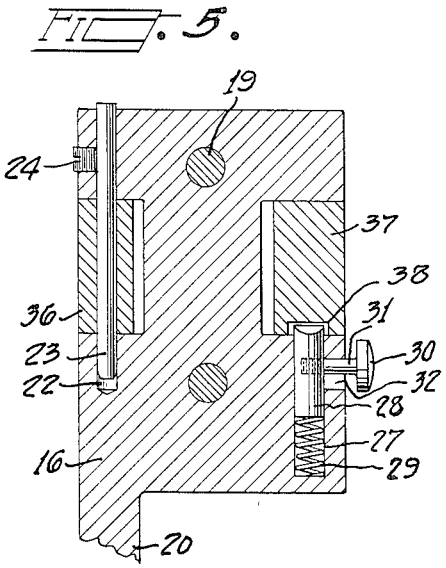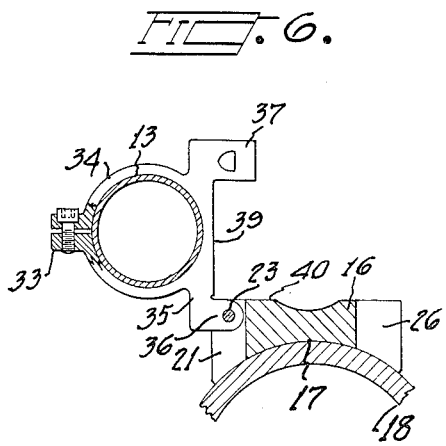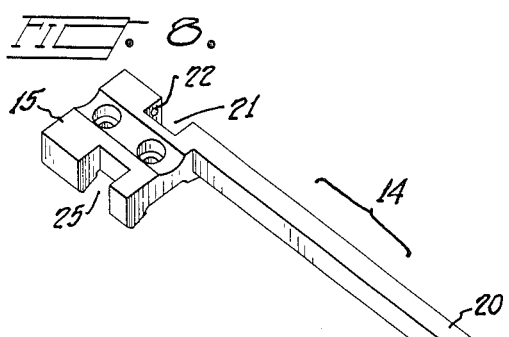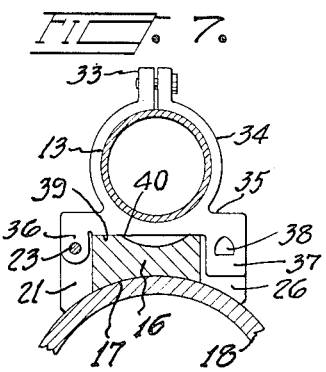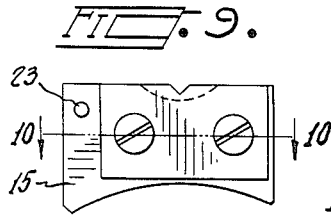

United States Patent Office 2,725,635
Patented Dec. 6, 1955

2,725,635

MOUNTING FOR TELESCOPIC GUNSIGHTS

John L. Cline, Milwaukie, Oreg.

Application September 29, 1952, Serial No. 312,153

5 Claims. (Cl. 33—50)

This invention relates generally to firearms and particularly to a mounting for telescopic gunsights.

The main object of this invention is to provide a reliable quick-acting mounting for a telescopic gunsight which can be easily moved back and forth between operative and inoperative positions and which will accurately hold the sight in an aiming position and will not be easily rendered inoperative.

A further object is to devise a mounting which will not be affected by the recoil of the firearm.

I accomplish these and other objects in the manner set forth in the following specification as illustrated in the accompanying drawings, in which Fig. 1 is a fragmentary plan of a rifle in dotted lines, showing the device in place in full lines.

Fig. 2 is a section taken along the line 2—2 in Fig. 1.

Fig. 3 is a section taken along the line 3—3 in Fig. 1.

Fig. 4 is a section taken along the line 4—4 in Fig. 1.

Fig. 5 is a section taken along the line 5—5 in Fig. 4.

Fig. 6 is a section taken along the line 6—6 in Fig. 1.

Fig. 7 is similar to Fig. 6 but showing the telescope in position for use.

Fig. 8 is a perspective view of the mounting bracket.

Fig. 9 is a transverse sectional view taken substantially along the plane of line 9—9 of Fig. 1.

Fig. 10 is a transverse sectional view taken substantially along the plane of line 10—10 of Fig. 9.

Like numbers of reference refer to the same or similar parts throughout the several views.

Referring in detail to the drawings, there is shown in dotted lines, the outline of a rifle 10 with its bolt mechanism 11 and the folding leaf sight 12. It is the purpose of this invention to provide a rugged holder for the telescope 13, which will permit it to be easily moved from the aiming position, shown in Fig. 7, to a non-use position, shown in Fig. 6.

Referring particularly to my invention, attention is drawn to Fig. 8 in which is shown an elongated base 14 composed of the end pads 15 and 16 having the concave under side 17 which rests upon the gun part 18. Each pad 15 and 16 is secured to the part 18 by a pair of fillister head screws 19. The pads 15 and 16 are joined along one side by a tie bar 20. Each pad 15 and 16 is provided with a slot 21 which is intersected by a pin hole 22 for a pivot pin 23 which is held in place by a setscrew 24.

Also formed in the pads 15 and 16 are the slots 25 and 26 which are directly opposite the slots 21. The slot 26 in the pad 16 is provided with a latch pin hole 27 for the latch pin 28 which is urged outwardly by the spring 29. An operating button 30 has its shank 31 extending through a slot 32 in the pad 16 into the pin 28.

Holding the telescope 13 are the clamps 33 which are similar in that both have the circular portions 34 formed on a base 35, from which depend the lugs 36 and 37, the former fitting closely in the slots 21 and the latter fitting into the slots 25 and 26. The only difference lies in the fact that one of the lugs 37 has a notch 38 formed in one side thereof to receive the latching end of the pin 28 when the under sides 39 of the clamps 33 are resting firmly on the top side 40 of the pads 15 and 16. The usual adjusting screws 41 and 42 are indicated on the telescope 13.

It can be seen from the foregoing that there is provided a scope mounting of great rigidity and accuracy of setting, which cannot be impaired by any ordinary usage.

I claim:

1. A telescope mounting for firearms comprising an elongated base having means for mounting it over the breech of a rifle, said base having a pair of vertical slots formed on opposite sides of opposite ends thereof, a pair of clamps for holding the barrel of a telescope, each of said clamps having lugs extending therefrom occupying said slots, one lug being hinged in a slot and the other lug having a latch for releasably securing it within its slot.

2. A mounting for telescopic gun sights comprising an elongated base adapted to be fixed to a gun over its breech, said base having a portion of its middle cut away to expose said breech, the front and rear ends of said base having vertical lateral slots formed therein, telescope clamping members having downturned lugs thereon, one of each of which is hinged in one of said slots and the other lug of each pair fitting into an adjacent base slot, one of said base slots having a spring latch therein engaging its respective lug when said clamp is fully seated on said base.

3. A mounting for telescopic gun sights comprising an elongated base having pads at the opposite ends thereof, each of said pads having lateral vertical slots opposite each other, scope clamps having downwardly projecting lugs, one of which is hinged in one slot and the other of which is latched in its respective slot when its clamp is seated firmly on its pad.

4. A telescope mounting for firearms comprising an elongated base provided with a pair of oppositely disposed open-sided slots at each end thereof, a pair of telescopic sight clamping elements, means longitudinally spacedly securing each of said elements to said base and including a pair of oppositely disposed lugs, each of said lugs being snugly received in a slot of the base, a pin carried by said base and extending through the slot and lug at one side and at each end thereof, the lugs at the other side of the base each having a recess in a face concealed by a complementary slot face, and manually releasable means carried by said base engageable in said recess for retaining the clamping elements in operative position.

5. A telescope mounting for firearms comprising an elongated base having a pair of oppositely disposed open-sided transverse slots at each end thereof on opposite sides of the base, front and rear telescopic sight clamps, each of said clamps having a transverse supporting surface extending between a pair of lugs projecting downwardly below said surface, pivot pins in said base extending through said slots and lugs on one side of said base to pivot said clamps for lateral swinging movement between operative and inoperative positions of the telescope, the supporting surfaces of said clamps in operative position seating on said base and the lugs on the other side of said clamps being disposed in said slots on the other side of said base whereby the four lugs sustain recoil and other forces acting on said clamps without excessive stress on said pivot pins, and manually releasable spring latch means projecting into one of said slots on said other side of said base to engage one of said lugs and secure the clamps in operative position.

References Cited in the file of this patent

UNITED STATES PATENTS

| | | |
|---|---|---|
| 2,193,094 | Gilbert | Mar. 12, 1940 |
| 2,425,130 | Shelley | Aug. 5, 1947 |
| 2,451,266 | Whittemore | Oct. 12, 1948 |
| 2,571,070 | Simon | Oct. 9, 1951 |
| 2,571,935 | Pachmayr et al. | Oct. 16, 1951 |
| 2,580,246 | Schall | Dec. 25, 1951 |
| 2,629,175 | Merritt | Feb. 24, 1953 |
| 2,639,507 | Pachmayr | May 26, 1953 |